United States Patent [19]

Williams et al.

[11] 4,450,404
[45] May 22, 1984

[54] PNEUMATIC SURFACE FOLLOWER WITH NEGATIVE FEEDBACK OF A VARIABLE FORCE COUNTERACTING THE LEVITATING FORCE

[75] Inventors: Paul Williams, Columbus; Dan R. Landis, Bexley, both of Ohio

[73] Assignee: Accuray Corporation, Columbus, Ohio

[21] Appl. No.: 315,173

[22] Filed: Oct. 26, 1981

[51] Int. Cl.³ .................. G01B 7/10; G01B 13/04; G01N 27/72
[52] U.S. Cl. ............................. 324/226; 324/229; 73/37.7
[58] Field of Search ............ 324/226, 227, 262; 73/37.5, 37.6, 37.7, 37.8, 37.9

[56] References Cited

U.S. PATENT DOCUMENTS

| 1,946,924 | 2/1934 | Allen | 33/125 |
|---|---|---|---|
| 3,194,055 | 7/1965 | Knobel | 73/37.5 |
| 3,321,838 | 5/1967 | Albertson | 33/174 |
| 3,495,442 | 2/1970 | Rejsa | 73/37.6 |
| 3,528,002 | 9/1970 | Dunlavey | 324/231 |
| 4,070,902 | 1/1978 | Knobel | 73/37.5 |

FOREIGN PATENT DOCUMENTS

| 1623202 | 12/1970 | Fed. Rep. of Germany . |
|---|---|---|
| 2028755 | 12/1971 | Fed. Rep. of Germany . |
| 52-38244 | 3/1977 | Japan . |
| 128332 | 5/1950 | Sweden . |
| 7900795-1 | 10/1980 | Sweden . |
| 839996 | 6/1960 | United Kingdom . |
| 589545 | 1/1978 | U.S.S.R. . |
| 603844 | 4/1978 | U.S.S.R. . |

OTHER PUBLICATIONS

Van Munn, P. H., "On Line Caliper Measurement and Control", in *TAPPI*, vol., 53, No. 5, May 1970, pp. 825–829.
Technical Bulletin 1505, "Non-Contacting LVDT Gage Heads, " Schaevitz Engineering, Pennsauken, N.J.

*Primary Examiner*—Gerard R. Strecker
*Assistant Examiner*—Walter E. Snow
*Attorney, Agent, or Firm*—C. Henry Peterson

[57] ABSTRACT

A gauging apparatus for sheet materials and the like comprises a surface follower body (14,20,30) adapted to be constrained without substantial solid bodily contact and guided (e.g., by gas bearings between 32 and 36 and 38) for movement along a surface follower path that intersects the path of a traveling sheet (10) to be gauged. The body has a passage (46) adapted to carry a flow of pressurized gas to be discharged against one surface of the sheet. The discharge of the gas is effective when the body is at a predetermined distance from the surface to generate a levitating force (on 20) urging the body away from the sheet surface. Means (70,64,62) responsive to the pressure of the gas in the passage exerts on the body (at 64) a counteracting force that tends to move the body closer to the surface. The counteracting force increases when the pressure increases and decreases when the pressure decreases, and coacts with the levitating force in such a manner that the predetermined distance of the body from the surface is normally maintained substantially constant and is relatively unaffected by minor variations in the pressure of the gas in the passage.

30 Claims, 7 Drawing Figures

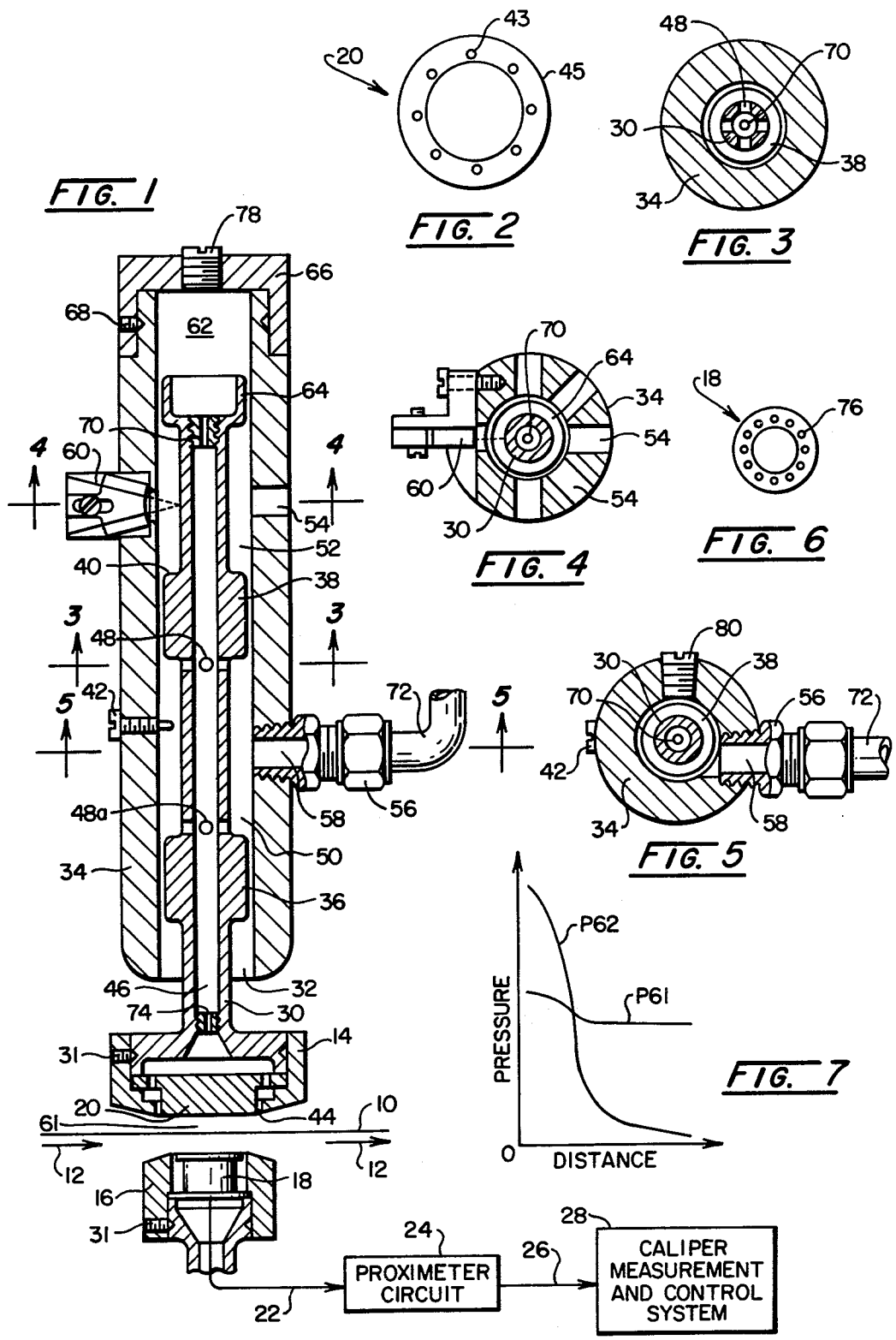

PNEUMATIC SURFACE FOLLOWER WITH NEGATIVE FEEDBACK OF A VARIABLE FORCE COUNTERACTING THE LEVITATING FORCE

CROSS REFERENCE TO RELATED APPLICATIONS

Various features of apparatus disclosed for completeness of description but not claimed herein are claimed in the copending applications of Paul Williams, Ser. No. 255,424 filed Apr. 20, 1981 for "Improvements in Measuring Apparatus," now U.S. Pat. No. 4,434,649, and Ser. No. 315,200 filed Oct. 2, 1981 by Thomas M. Domin, Paul Williams and Dan R. Landis for "Sheet Measuring Apparatus."

TECHNICAL FIELD

This invention relates to apparatus for maintaining a surface follower body at a substantially constant distance from a surface that is movable in space, by discharging against the surface a flow of pressurized gas that is effective to generate a levitating force urging the body away from the surface. More particularly the invention relates to such apparatus wherein the gas flow is carried by a passage in the body, and the gas pressure in the passage is used to control the magnitude of a counteracting force that tends to move the body closer to the surface. The counteracting force increases when the gas pressure in the passage increases, and decreases when the gas pressure decreases, and coacts with the levitating force so that the substantially constant distance of the body from the surface is relatively unaffected by variations of the pressure of the gas in the passage.

While there are a number of uses for such apparatus, the invention is herein described and illustrated in a caliper gauge embodiment for measuring the thickness of paper, plastic, rubber and the like, particularly paper in the form of a traveling sheet.

BACKGROUND ART

Surface followers and measuring apparatus of the general type to which this invention relates are described in the U.S. Pat. Nos. 1,946,924 Allen; 3,194,055 Knobel; 3,321,838 Albertson; 3,495,422 Rejsa, and 3,528,002 Dunlavey. Other background disclosures are contained in British Pat. Specification No. 839,996 (1960); USSR Inventors' Certificates 589,545 (1978) and 603,844 (1978), Japanese Pat. Application Public Disclosure 52-38244 (1977) and Swedish application No. 7900795-1, (published 1980).

Pneumatic surface followers are frequently used to maintain a predetermined distance between two objects. One or both objects may carry a transducer element to provide an input to a system for effecting measurement and control.

The thickness or caliper of moving sheets is commonly measured by passing the sheet over a roll or fixed plate on one side of the sheet while a surface follower automatically positions itself at a nominally constant distance from the surface of the sheet on the other side. Either the plate or the surface follower or both may contain a proximeter element such as a magnetic reluctance or eddy current sensor element while the other may contain a target element. An unsupported sheet may travel between two surface followers, one of which may contain a proximeter while the other may contain a target element. The proximeter responds to its distance from the target, and the sheet thickness is derived in effect by subtraction of the nominally constant distance or distances of the sheet follower or followers from the sheet surface or surfaces. It has been found, however, that the nominally constant distance is subject to variation with changes in the gas supply pressure.

Moreover the nature of the forces acting on the body, together with its mass, have generally resulted in a dynamic system with a high degree of instability, so that the position of the body tends to go into oscillation in response to slight upsets such as rapid changes in the thickness or the spatial position of the sheet being measured. Most, if not all, pneumatic surface followers have a passage that carries the flow of pressurized gas to be discharged against the sheet surface, and commonly the pressure in the passage varies with the distance of the surface follower body from the surface. Commonly this pressure variation produces what is herein termed "positive feedback", in that a variable force component acting on the surface follower body tends to move it, or allow it to move, farther from the surface when the pressure increases and closer to the surface when the pressure decreases.

The positive feedback may be accidental or introduced by deliberate design, on the theory that when the surface follower body is too close to the surface, for example, the gas outlet is abnormally restricted, causing the gas pressure in the passage to increase abnormally, and that the correct action to take is to use the abnormally increased pressure to generate a force, or increased force, causing the body to move farther from the surface, and thus tending to correct the original error in the position of the body.

It now appears that such prior art has failed to recognize that when the surface follower body is levitated by a "gas bearing" film of pressurized gas, in the above situation the increased levitating force generated by the increased gas bearing pressure may itself be more than sufficient to move the body away from the surface to its correct normal distance therefrom. Hence the addition of the positive feedback force component may simply help to drive the body too far from the surface and hence force the system into undesired oscillation. In other words, it appears that the prior art has failed to recognize that the positive feedback force component is applied in the wrong direction, or with the wrong phase, and that what is actually needed is what is herein termed "negative feedback" in order to stabilize the system.

DISCLOSURE OF INVENTION

In accordance with this invention, there is provided gauging apparatus for sheet materials and the like, comprising a surface follower body adapted to be constrained without substantial solid bodily contact and guided for movement along a surface follower path that intersects the path of a traveling sheet to be gauged, the body having a passage adapted to carry a flow of pressurized gas to be discharged against one surface of the sheet, the discharge of the gas being effective when the body is at a predetermined distance from the surface to generate a levitating force urging the body away from the sheet surface, means responsive to the pressure of the gas in the passage for exerting on the body a counteracting force that tends to move the body closer to the surface, the counteracting force increasing when the pressure increases and decreasing when the pressure decreases, and coacting with the levitating force in such a manner that the predetermined distance of the body from the surface is normally maintained substantially constant and is relatively unaffected by minor variations in the pressure of the gas in the passage.

Typically the apparatus comprises means for receiving pressurized gas and for delivering the same to the passage, the gas delivery means being effective when the surface follower body is in close proximity to the surface to cause the gas pressure in the passage to vary inversely with the distance of the body from the surface, so that the counteracting force increases when the distance decreases and decreases when the distance increases, whereby the movement of the body along the surface follower path to maintain the substantially constant distance is stabilized.

The means responsive to the pressure of the gas in the passage may comprise an area on the surface follower body that is located so as to face generally away from the sheet surface against which the pressurized gas is being discharged, and means for applying to said area a gas pressure that varies directly with the pressure of the gas in the passage. The gas pressure applying means may comprise conduit means communicating with the passage. The conduit means may extend through the surface follower body, and may comprise an extension of the passage. The conduit means may comprise an axial passage through the body.

Typically the means responsive to the pressure of the gas in the passage comprises means cooperating with said area on the surface follower body to form an enclosed space that is pressurized with the gas pressure applied to said area. The enclosed space may be partially defined by a cylinder, and said area on the surface follower body may be on one face of a piston that is movable in the cylinder. The gas pressure applying means may comprise conduit means communicating with the enclosed space, the conduit means including a restriction for limiting the flow rate of pressurized gas therethrough.

The enclosed space may have a vent, the vent including a second restriction for limiting the flow rate of pressurized gas therethrough, the relative sizes of the first and second restrictions determining the magnitude of the gas pressure exerted on said area in relation to the magnitude of the pressure of the gas in the passage.

The enclosed space may be partially defined by a cylinder; said area on the surface follower body may be on one face of a piston that is movable in the cylinder, and the second restriction may comprise a clearance gap between the cylinder and the piston. The enclosed space, the cylinder, the piston, and the clearance gap may be adapted to constitute a dashpot for damping rapid movement of the surface follower body.

Typically the gas delivery means comprises first conduit means having an inlet orifice for restricting the flow of pressurized gas to the passage, the apparatus further comprising an outlet orifice for restricting the flow of pressurized gas to be discharged against the one surface of the sheet, the relative sizes of the inlet and outlet orifices affecting the pressure of the gas in the passage. The apparatus may comprise second conduit means communicating with the passage for conducting a second flow of gas therefrom, the second conduit having gas flow limiting means cooperating with the inlet and outlet orifices to determine a base value for the pressure of the gas in the passage. Said means responsive to the pressure of the gas in the passage may respond to the base value thereof to produce a base component of said force which is exerted in a direction to urge the surface follower body toward the one surface of the sheet. The gas flow limiting means may comprise a first and a second restriction, the relative sizes of the restrictions determining the magnitude of the base force component in relation to the magnitude of the pressure of the gas in the passage. The gas pressure existing between the first and second restrictions may be applied to said area on the surface follower body that is located so as to face generally away from the sheet surface against which the pressurized gas is being discharged. The second flow of gas may be vented to ambient pressure, and may pass through the clearance gap between the cylinder and the piston.

The apparatus may comprise means for receiving pressurized gas and for conducting the same to the passage without allowing the pressurized gas to exert a substantial net force tending to change the distance of the body from the surface. The apparatus may comprise a cylinder for guiding the body along the surface follower path, and the means for conducting the pressurized gas to the passage may comprise a pair of piston-like lands on the surface follower body for receiving the pressurized gas therebetween, the lands being movable in the cylinder and adapted to generate substantially equal and oppositely directed forces on the body generally parallel to the surface follower path. The lands and the cylinder may be adapted to form a gas bearing for constraining and guiding the surface follower body without substantial solid bodily contact between the lands and the cylinder.

The surface follower body may be arranged to spin around a central axis within the surface follower path, and the means for conducting the pressurized gas to the passage may be arranged to direct the pressurized gas against the surface follower body so as to impart thereto a spinning motion around the axis. The apparatus may comprise means for detecting the spinning motion of the body without solid bodily contact therewith.

Typically the apparatus constitutes a caliper gauge comprising proximeter target means aboard the surface follower body, and means including proximeter probe means on the opposite side of the sheet from the body and responsive to the distance separating the target means from the probe means for producing a response to the thickness of the sheet. The proximeter probe means may be aboard a second surface follower body.

The objects of the invention are to provide improved apparatus that can maintain a pneumatic surface follower body at a more constant distance from a surface, to provide such apparatus wherein the distance is less subject to variation as a result of gas supply pressure variations, to provide such apparatus that is better stabilized against overshoot and oscillation of the surface follower body position with respect to the surface, and to provide a more accurage caliper gauge employing a pneumatic surface follower.

Other objects and advantages of the invention will become apparent in the following detailed description, taken in conjunction with the appended drawings.

BRIEF DESCRIPTION OF THE DRAWINGS

FIG. 1 is a partly schematic view of sheet caliper gauging apparatus, including an elevational view in section, showing a surface follower apparatus according to the invention.

FIG. 2 is a bottom view of the proximeter target 20 of FIG. 1.

FIG. 3 is a section on the line 3—3 of FIG. 1.

FIG. 4 is a section on the line 4—4 of FIG. 1.

FIG. 5 is a section on the line 5—5 of FIG. 1.

FIG. 6 is a bottom view of the proximeter coil housing 18 of FIG. 1.

FIG. 7 is a graph showing typical pressures as a function of distance.

BEST MODE FOR CARRYING OUT THE INVENTION

Referring to the drawings, FIG. 1 in particular, the numeral 10 designates the edge of a continuous sheet of material such as paper traveling in the direction of the arrows 12. Typically the paper would be traveling from the calender stack to the windup section of a paper making machine (not shown).

For the purpose of measuring and controlling the caliper, or thickness, of the sheet 10, the sheet is measured continuously by a caliper gauge of the general type disclosed in U.S. Pat. No. 3,528,002 Dunlavey, supra. To this end, while the measurement is in progress a first and a second floating head 14 and 16 are pneumatically maintained at nominally constant, predetermined distances from the respective upper and lower surfaces of the sheet 10.

The lower head 16 has an eddy current proximeter probe coil, contained in a housing 18, and the upper head 14 contains a proximeter target 20. As suggested by a connecting line 22, the probe coil in housing 18 forms a part of a proximeter circuit 24. The proximeter circuit responds to the distance separating the probe 18 from the target 20.

As suggested by a connecting line 26, the proximeter response is utilized as shown by a caliper measurement and control system 28 that may be of the general type described in an article by Van Munn, P. H., "On Line Caliper Measurement and Control," in TAPPI, Vol. 53, No. 5, May 1970, pp. 825–829. In a conventional manner, the system 28 in effect determines the distance of the head 14 from the head 16 and subtracts the two substantially constant distances of the heads from the respective, adjacent surfaces of the sheet 10 to produce a response to, and indicative of, the thickness of the sheet between its two nominal surfaces. The thickness response may be used to indicate and/or record the sheet thickness, and/or it may be used to automatically control the paper machine (not shown) so as to maintain the sheet thickness constant at a desired value.

The floating head 14 forms part of a surface follower body that includes a shaft 30 secured to the head 14 by set screws as at 31. The body is adapted to be constrained and guided for movement along a surface follower path that intersects the path of the traveling sheet 10 to be gauged. The surface follower path is defined by the location of a central, longitudinal, cylindrical bore 32 that extends all the way through a housing member 34. The shaft 30 is enlarged in two places to form a pair of piston-like lands 36 and 38 with rounded corners as at 40. The lands and the cylinder bore 32 are adapted to form gas bearings for constraining and guiding the surface follower body without substantial solid bodily contact between the lands and the cylinder. In order to better visualize the mode of operation, the mechanical clearance between the cylinder bore 32 and the lands 36 and 38 is greatly exaggerated as shown.

Conventionally, the housing 34 is mounted in a suitable pneumatic piston and cylinder or electrical solenoid operated lift-off mechanism (not shown). The lift-off mechanism is adapted to lift the housing 34 vertically a distance sufficient to suspend the floating head 14 above the surface of the sheet 10. When so suspended, the surface follower rests with the land 38 supported against the rounded tip of a travel limiter screw 42 that extends through a tapped opening in the housing 34.

Conventionally also, the housing and its lift-off mechanism are mounted on a traversing mechanism (not shown) so that the caliper gauging heads 14 and 16 are movable across the width of the sheet 10 that should be visualized to extend into and out of the paper on which FIG. 1 is printed. An example of a traversing mechanism and a lift-off mechanism is described in U.S. Pat. No. 3,528,002 Dunlavey, supra.

During measurement, the lift-off mechanism (not shown) maintains the housing 34 in the lowered position shown in FIG. 1. At this time the surface follower body is normally maintained at a predetermined distance (here shown greatly exaggerated for clarity of illustration) from the upper surface of the sheet 10 by a "gas bearing" film of slightly pressurized gas between the floating head 14 and the sheet 10. This gas bearing is created by discharging a flow of pressurized gas (typically compressed air) against the one surface of the sheet through an annular slot 44 between the floating head member 14 and the ferrite proximeter target 20. The slot 44 is supplied with gas through holes as at 43 (FIG. 2) in the flange 45 of the target 20. The discharge of the gas is effective when the surface follower body is at the predetermined distance from the surface to generate a levitating force urging the body away from the sheet surface.

The flow of pressurized gas to be discharged against the surface of the sheet is carried by a passage 46 in the surface follower body. The passage 46 comprises a portion of an axial bore that extends all the way through the shaft 30. The pressurized gas is delivered to the passage 46 through a set of four radial holes as at 48 in the shaft 30 (see FIG. 3) and an identical set of holes as at 48a. The gas is conducted to the holes 48 and thence to the passage 46 from a coaxial chamber 50 formed between the piston-like lands 36 and 38 and within the cylinder bore 32. Although the lands are movable in the cylinder, they are adapted to generate substantially equal and opposite forces on the surface follower body generally parallel to the surface follower path when the gas pressure is present in the coaxial chamber 50. Thus the pressurized gas is conducted to the passage without allowing the pressurized gas to exert a substantial net force tending to change the distance of the surface follower body from the surface of the sheet 10.

A portion of the pressurized gas fed to chamber 50 escapes through the clearance gaps between the lands 36 and 38 and the cylinder 32, thereby maintaining the gas films that constitute the gas bearings for constraining and guiding the surface follower body. The gas passing the land 36 goes directly to ambient space, whereas that passing the land 38 is collected in a second coaxial chamber 52 and thence vented to ambient space through radial holes as at 54 in the housing 34 (see also FIG. 4).

The gas delivery system and gas bearing arrangement so far described is somewhat similar to that disclosed in U.S. Pat. No. 3,321,838 Albertson, supra, FIGS. 16 and 17. However, as herein shown particularly in FIG. 5, in the present apparatus the pressurized gas is received by a pipe fitting 56 installed in the housing so that the axis of the center hole 58 of the fitting is offset from the axis of the shaft 30 by only a small distance.

The offset is designed to cause the inflowing pressurized jet of gas to be directed against the shaft 30 of the surface follower body so as to impart thereto a spinning motion around the central axis of the body. Conventional expedients not described herein are used to ensure that the body is dynamically balanced. Depending on the application, the body may spin at an angular velocity on the order of a thousand revolutions per minute, suspended (in the configuration shown in FIG. 1) on the gas bearing between the head 14 and the sheet 10, and guided by the gas bearings between the lands 36 and 38 and the cylinder 30.

The spinning allows the proximeter circuit 24 to average out the effects of magnetoelectric inhomogeneities in the coupling of the probe 18 and the target 20. The spinning also appears to make the measurements less affected by variation in the surface roughness, for reasons that are more apparent from the disclosure of the Williams application Ser. No. 255,424 supra.

Typically the spinning rate is detected by a commercial optical reflective switch 60 such as the Spectronics SPX 1404-1 installed in one of the vent openings 54. The switch 60 views an optically contrasting vertical stripe (not shown) such as an aluminized strip on the shaft 30. The detected spinning rate is typically compared with the normal spinning rate and used to trigger a malfunction indicator when an abnormal spin rate is detected.

As is known, there are a number of forces acting on the surface follower body, including the force of gravity, the two equal and opposite (upward and downward) forces exerted on lands 36 and 38 by the pressure in the chamber, and the levitating force urging the body away from the sheet 10 surface. Assuming for example that the pressurized gas is compressed air and that the ambient pressure is atmospheric pressure, the levitating force is generated mainly by a positive (above ambient) pressure within what is herein termed a "gas bearing region," or "air bearing region" 61 under the floating head 14. The positive pressure in the air bearing region is typically exerted over the entire bottom surface of the target disk 20. Outwardly of the air bearing region is a very small negative (below ambient) pressure region between the floating head and the surface of sheet 10, due to the fact that the outwardly moving air has been accelerated, exchanging some of its pressure head for velocity head according to the conservation of energy principle (Bernoulli's Theorem). This allows the ambient pressure acting on the top-facing surface of the floating head 14 to exert a very slight downward force on the surface follower body, thus slightly reducing the magnitude of the gross levitating force produced by the positive pressure in the air bearing region under the head 14.

The present invention further provides means responsive to the pressure of the gas in the passage 46 for exerting on the surface follower body a counteracting force that tends to move the body closer to the surface of sheet 10. This counteracting force is generated by gas pressure, in an enclosed space 62, that acts on a piston 64 formed as a terminal enlargement of shaft 30. The piston 64 has a significantly smaller diameter than the lands 36 and 38, and hence there is no need for extreme accuracy in construction to ensure perfect alignment of these three portions of the surface follower body. The piston 64 is counterbored from its terminal end to remove excess material and thereby to reduce the mass of the body.

The piston 64 provides an area (here shown on the top facing surfaces of the piston) on the surface follower body that is located so as to face generally away from the sheet 10 surface against which the pressurized gas is being discharged. The space 62 is enclosed by the piston area, the cylinder formed by the inner bore 32 of the housing 34, and a housing cap 66 that is secured to a reduced-diameter end portion of the housing by set screws as at 68.

The gas pressure in the enclosed space 62 that is applied to the area of the piston 64 is caused to vary directly with the pressure of the gas in the passage 46. In the embodiment shown, the axial passage 46 in the shaft 30 is simply extended, and the extension forms a second conduit means extending through the surface follower body and communicating with the passage 46 for applying the gas pressure in the passage per se to the enclosed space 62 and thence to the force generating area on piston 64. This second conduit means includes a restriction 70 comprising an axially drilled hole in a hexagonal socket head set screw that is threaded into the end of the passage 46 extension. The restriction 70 limits the flow rate of pressurized gas therethrough.

The enclosed space 62 is vented through a second restriction formed by the clearance gap between the cylinder and the piston 64. The relative sizes of the first and second restrictions determines the magnitude of the gas pressure exerted on the top-facing surface area of the piston in relation to the magnitude of the pressure of the gas in the passage 46. The enclosed space 62, the cylinder and piston 64 and the clearance gap are also adapted to constitute a dashpot for damping rapid movement of the surface follower body, such as that, for example, caused by an occasional narrow lump or projection on the fast-traveling sheet 10 that strikes the beveled underside of the floating head 14.

The means discussed briefly above for receiving pressurized gas and for delivering it to the passage 46 comprises conduit means having an inlet orifice for restricting the flow of pressurized gas to the passage. In the embodiment shown there are effectively at least three orifice means that offer some restriction to gas flow; i.e. the radial holes 48 and 48a in shaft 30, the central opening 58 in the pipe fitting 56, and a tube 72 that connects to a pressure-regulated pressurized gas supply (not shown). An alternate construction could use a master inlet metering orifice such as that described in Swedish Patent Application No. 7900795-1, supra, which discloses a somewhat similar pressurized gas distribution system in a surface follower body. Typically, however, in an embodiment such as that illustrated, the radial holes 48 and 48a constitute the controlling inlet orifice restriction, with the others being of ample size. With such a construction, the supply of gas to the passage 46 is not substantially affected by the particular clearances, within tolerances, allowed between the lands 36 and 38 and the cylinder bore 32 where the air bearings are formed.

The flow of pressurized gas to be discharged against the top surface of the sheet 10 is restricted by an outlet orifice which in the embodiment shown comprises the combination of the holes as at 43, the slot 44 between the head member 14 and the target 20, and an interchangeable orifice 74, which, like the restriction 70, is formed by a drilled opening in a hexagonal socket head set screw.

The relative sizes of the inlet (48, 58, 72) and outlet (43, 44, 74) orifices affects the pressure of the gas in the passage 46. The second conduit means with its gas flow limiting means (restriction 70 and the clearance gap between piston 64 and the cylinder bore 32) cooperates with the inlet and outlet orifices to determine, with the regulated pressurized gas supply system (not shown) that connects to tube 72, a base value for the pressure of the gas in the passage 46.

The base pressure value may be defined as the pressure in passage 46 when the surface follower system is operating normally under steady state conditions, for example, when the sheet 10 is not moving and the surface follower body is supported on its gas bearing at its nominal, constant distance from the sheet surface. In response to the base pressure value, the pressure on top of the piston 64 exerts a base component of force counteracting the levitating force and urging the surface follower toward the top surface of the sheet. The relative sizes of the restriction 70 and the clearance gap between piston 64 and the cylinder determines (with the piston area) the magnitude of the base force component in relation to the magnitude of the base pressure of the gas in the passage 46.

It is apparent that if the pressure of the gas in passage 46 should increase, for example, a greater flow of gas will pass through orifices 74, 43 and 44 to be discharged against the surface of the sheet 10. If there is a constant downward force on the surface follower body, this greater flow of gas will tend to be accommodated by a slight increase in the gap separating the floating head 14 from the sheet surface, while the gas pressure within the gas bearing region under the head 14 remains substantially constant. However, the slight increase in the gap should not be permitted, since it results in an error in the caliper measurement. Hence, according to the invention, the increase in the pressure of the gas in passage 46 is caused to produce a greater counteracting force exerted by piston 62 in the downward direction. The greater downward force tends to prevent the slight increase in the gap separating the floating head 14 from the sheet surface, instead causing the pressure within the gas bearing region to increase and produce a greater levitating force.

In this way the counteracting force and the levitating force coact in such a manner that the predetermined distance of the surface follower body from the sheet surface is normally maintained substantially constant and is relatively unaffected by minor variations in the pressure of the gas in the passage 46. If the pressure decreases, the forces of course coact in the opposite manner to prevent a decrease in the distance.

The foregoing detailed explanation of the pressure-indepedent operation, however, only takes into account its independence of different values of the base pressure that is assumed to prevail under steady state conditions. Different values of the base pressure produce different, corresponding values of the base component of the counteracting force. The typical cause of a change in the base pressure value is of course a change in the pressure of the pressurized gas provided to the tube 72 for operating the pneumatic surface follower.

However, steady state conditions seldom exist when the apparatus of FIG. 1 is in use, for example, to measure the caliper of paper as it is being produced by a paper making machine. Under these dynamic conditions the predetermined, nominally constant distance of the surface follower body from the sheet surface is continually being upset by vibrations, flutter and/or rapid changes in the sheet thickness and/or its position in space, as well as by the occasional narrow protuberance on the sheet that may make solid bodily contact with one or both of the floating heads 14 and 16. Since a surface follower body has mass, and since gas pressure changes cannot be transmitted instantly, it is obviously impossible for the surface follower body always to be maintained at the predetermined, desired distance from the sheet. However, when an upset does occur, it is most important for the surface follower system to be able to accurately restore the nominal distance from the sheet surface very rapidly, but without substantial overshoot and/or oscillation of the surface follower body. It is believed that the negative feedback function of the apparatus according to the invention contributes substantially to this desirable result.

In the apparatus as above described, the source of pressurized gas (not shown) is typically a relatively constant pressure source and the negative feedback action is achieved simply by incorporating an appropriate flow restricting inlet orifice in the means for delivering the pressurized gas to the passage 46. The restricting orifice as shown is constituted effectively by the radial holes 48 in the shaft 30. This restricting orifice has the effect of causing the base value for the pressure of the gas in the passage 46 to be lower than the pressure of the source that supplies pressurized gas to the tube 72. It also has the effect of causing the gas pressure in the passage 46 to vary inversely with the distance of the surface follower body from the sheet surface.

There is a progressive reduction in the pressure of the gas as it flows successively through tube 72, opening 58, chamber 50, holes 48, passage 46, orifice 74, holes 43, slot 44, and finally through the gap between the floating head 14 and the sheet 10. The final pressure drop through this gap corresponds substantially to the pressure (above ambient) in the gas bearing region 61. The pressure in the gas bearing region acts on the undersurface of the head 14 to produce the gross levitating force that keeps the surface follower body suspended above the sheet 10.

If the distance between the sheet 10 and the surface follower body decreases, for example, as a result of a sudden increase in the thickness of the sheet, the gap between the sheet and the floating head 14 will be narrowed, thus further restricting the flow of pressurized gas discharged against the sheet surface and escaping to ambient pressure. The increased flow restriction will result in an increase in pressure in the gas bearing region 61, increasing the levitating force on the surface follower body. As a result of decreased gas flow, there will be less pressure drop particularly through holes 48, causing the pressure in passage 46 to increase, increasing the gas flow through the restriction 70 and increasing the pressure in the enclosed space 62, which pressure is applied to piston 64, thus increasing the counteracting force exerted downwardly on the surface follower body.

However, because of the volume of the enclosed space 62 and the smallness of the restriction 70, inter alia, the full increase in the counteracting force does not take place instantaneously. Instead, there is a slight delay that allows some time for the increased levitating force developed under the floating head 14 to accelerate the surface follower body upward, thereby to more quickly restore the predetermined distance between the body and the sheet 10. The phase-delayed application of the increased counteracting force is then effective to decelerate the surface follower body so that it can come to "rest" at the predetermined distance, without substantial overshoot or the initiation or sustentation of oscillations in the body movement.

If the distance between the sheet and the surface follower body increases, the coaction of the levitating force and the counteracting force takes place in the opposite manner from that just described. It should be noted that these forces are self-limiting at certain distances from the sheet surface. The levitating force, for example, quickly disappears when the distance increases much beyond that where the gas flow restriction due to the proximity of the surface follower to the sheet is equal to the gas flow restriction due to the size of the orifice 74 and the slot 44. Thus the inverse variation of the gas pressure in passage 46, for example, is not a simple inverse function of distance.

It has been contemplated that instead of using the pressurized gas in the passage 46 per se to supply the power for implementing the negative feedback, one could detect the pressure variations occurring in the passage with a suitable detector, for example, one employing a fludic amplifier and use the amplifier to control the application of pneumatic pressure from a supplemental compressed gas source. While such a modified apparatus might have an advantage in being better able to follow very rapid sheet thickness changes, it might also have the severe disadvantage of being unable to yield quickly, for example, when the occasional narrow protuberance on a fast-traveling sheet strikes the floating head 14, thus making the apparatus prone to cause frequent sheet breaks on a paper making machine, for example.

FIGS. 2–6 show the construction and proportions of a proposed embodiment in accordance with what is presently believed to be the best mode for practicing the invention, in order to provide improved paper sheet caliper measurements, for example. In this embodiment the housing 34 is to have a length of 5.25 inches (13.34 cm) and the bore is to be 0.625 inches (1.59 cm) in diameter. This embodiment, however, has not yet been constructed and tested.

In an embodiment that has been constructed and tested, the housing 34 is 4.88 inches (12.40 cm) long, and the bore 32 is 1.000 inches (2.54 cm) in diameter. The lands 36 and 38 have a diameter of 0.997 inches (2.53 cm) and the piston 64 a diameter of 0.980 inches (2.49 cm). Restriction 70 is provided by a 10−32×¼ inch (6.4 mm) hexagonal socket head set screw with an axial drilled hole 0.081 inches (2.06 mm) in diameter. Orifice 74 has a diameter of 0.159 inches (4.04 mm) and holes 48 a diameter of 0.040 inches (1.02 mm). Fitting 56 is a commercial ⅛ inch (3.18 mm) pipe connector having an opening 58 with a minimum dimension of 3/16 inches (4.8 mm).

The floating heads 14 and 16 as shown are typically constructed in accordance with the invention described and claimed in the Williams application Ser. No. 255,424 supra so as to achieve substantial independence of the paper line speed and sheet 10 roughness. The shaft member may be constructed of aluminum, or a suitable plastic, such as that marketed under the trademark Delrin, that has been properly annealed and stress-relieved. In the one embodiment tested the slot 44 has a vertical length of 0.062 inches (1.59 mm) and is formed between a 0.712 inch (1.81 cm) diameter portion of the target piece 20 and a 0.720 inch (1.83 cm) opening in the floating head member 14.

The floating head 16 has a slot formed between the proximeter probe housing 18 and a 0.5625 inch (1.429 cm) diameter opening in the head member 16. This slot has a vertical length of about 0.032 inches (0.8 mm) defined by the width of the smaller diameter (0.556 inches or 1.41 cm) spool end. The larger diameter spool end shown in FIG. 6 has twelve holes as at 76, each 0.031 inches (0.79 mm) in diameter to feed compressed gas to the slot.

Typically the tube 72 may be fed with filtered compressed air at a pressure of about eight pounds per square inch (8 psi) which is equivalent to about 55 kilopascals (55 kpa) or about 221 inches (563 cm) of water. The embodiment has a pipe plug 78 (FIG. 1) allowing the pressure in the enclosed space 62 to be measured, as well as a pipe plug 80 (FIG. 5) allowing measurement of the pressure in the coaxial chamber 50. The pressure in the gas bearing region 61 was measured in the laboratory with the surface follower apparatus operating over a rigid flat plate that simulates the surface of the paper 10. The plate is pierced to accommodate a fine static-pressure tube that is centrally positioned under the target 20 and out of the path of the gas jet issuing from slot 44.

FIG. 7 is a plot of typical pressures existing in the enclosed space 62 and the gas bearing region 61 as a function of the distance separating the floating head 14 from the surface 10. To obtain such data, the surface follower body and the housing 34 were locked together so as to prevent movement of the surface follower in the housing while the entire assembly was moved vertically through a range of known distances from the surface 10. The predetermined distance of the surface follower (head 14) from the surface 10 when the device is operating normally may be about 0.0025 inches (65 microns).

The pressures in the gas bearing region 61 are indicated by the curve P61, and the pressures in the enclosed space 62 by the curve P62. The levitating force under the head 14 can be estimated by multiplying a P61 value by the area on the bottom surface of the head 14, inside the boundary of the slot 44. The counteracting force can be estimated by multiplying a P62 value by the top-facing area of the piston 64. A typical maximum value of P62 as shown in FIG. 7 is about six inches of water (about 1.5 kpa) whereas the maximum value of P61 may be about fourteen inches of water (about 3.5 kpa). In normal operation at the predetermined distance, the pressure P62 may be about 5 inches of water (1.2 kpa) and the pressure P61 about 13 inches (3.2 kpa). Hence at the predetermined distance the levitating force may be about 3–3.5 ounces (90–100 grams) and the counteracting force about 2 ounces (60 grams). The weight of the surface follower is about 1.5 ounces (40 grams) in the above example. The pressure measurements were not highly accurate, precision measurements, due to the rather crude experimental setup that was used.

The foregoing pressure and force relationships are based on static values only. So far no substantial effort has been made to determine precise phase relationships under dynamic conditions. It is believed that eventually these phase relationships, as well as the static relationships, can be optimized.

While the invention has been described and illustrated as particular apparatus, the showing and description are clearly illustrative only and not restrictive, since obviously many changes, modifications and outwardly different embodiments can be made without departing from the spirit and scope of the invention.

What is claimed is:

1. Gauging apparatus for sheet materials and the like comprising a surface follower body which during a gauging operation is constrained without substantial solid bodily contact and guided for movement along a surface follower path that intersects the path of a traveling sheet to be gauged, the body having a passage which during a gauging operation carries a flow of pressurized gas that is provided by a pressurized gas supply means and which gas is discharged against one surface of the sheet, the discharge of the gas being effective when the body is at a predetermined distance from the surface to generate a levitating force urging the body away from the sheet surface, the gas pressure in the passage being subject to variation as a result of changes in the gas supply and changes in the distance of the surface follower body from the surface, means responsive to the pressure of the gas in the passage for exerting on the body a counteracting force that tends to move the body closer to the surface, the counteracting force increasing when the pressure increases and decreasing when the pressure decreases, and coacting with the levitating force in such a manner that the predetermined distance of the body from the surface is normally maintained substantially constant and is relatively unaffected by minor variations in the pressure of the gas in the passage.

2. Apparatus as in claim 1 comprising means for receiving pressurized gas and for delivering the same to the passage, the gas delivery means being effective when the surface follower body is in close proximity to the surface to cause the gas pressure in the passage to vary inversely with the distance of the body from the surface, so that the counteracting force increases when the distance decreases and decreases when the distance increases, whereby the movement of the body along the surface follower path to maintain the substantially constant distance is stabilized.

3. Apparatus as in claim 2 wherein the means responsive to the pressure of the gas in the passage comprises an area on the surface follower body that is located so as to face generally away from the sheet surface against which the pressurized gas is being discharged, and means for applying to said area a gas pressure that varies directly with the pressure of the gas in the passage.

4. Apparatus as in claim 3 wherein the gas pressure applying means comprises conduit means communicating with the passage.

5. Apparatus as in claim 4 wherein the conduit means extends through the surface follower body.

6. Apparatus as in claim 5 wherein the conduit means comprises an extension of the passage.

7. Apparatus as in claim 5 wherein the conduit means comprises an axial passage through the body.

8. Apparatus as in claim 3 wherein the means responsive to the pressure of the gas in the passage comprises means cooperating with said area on the surface follower body to form an enclosed space that is pressurized with the gas pressure applied to said area.

9. Apparatus as in claim 8 wherein the enclosed space is partially defined by a cylinder, and said area on the surface follower body is on one face of a piston that is movable in the cylinder.

10. Apparatus as in claim 8 wherein the gas pressure applying means comprises conduit means communicating with the enclosed space, the conduit means including a restriction for limiting the flow rate of pressurized gas therethrough.

11. Apparatus as in claim 10 comprising a vent for the enclosed space, the vent including a second restriction for limiting the flow rate of pressurized gas therethrough, the relative sizes of the first and second restrictions determining the magnitude of the gas pressure exerted on said area in relation to the magnitude of the pressure of the gas in the passage.

12. Apparatus as in claim 11 wherein the enclosed space is partially defined by a cylinder, wherein said area on the the surface follower body is on one face of a piston that is is movable in the cylinder, and wherein the second restriction comprises a clearance gap between the cylinder and the piston.

13. Apparatus as in claim 12 wherein the enclosed space, the cylinder, the piston, and the clearance gap constitute a dashpot for damping rapid movement for the surface follower body.

14. Apparatus as in claim 2 wherein the gas delivery means comprises first conduit means having an inlet orifice for restricting the flow of pressurized gas to the passage, the apparatus further comprising an outlet orifice for restricting the flow of pressurized gas to be discharged against the one surface of the sheet, the relative sizes of the inlet and outlet orifices affecting the pressure of the gas in the passage.

15. Apparatus as in claim 14 comprising second conduit means communicating with the passage for conducting a second flow of gas therefrom, the second conduit means having gas flow limiting means cooperating with the inlet and outlet orifices to determine a base value for the pressure of the gas in the passage.

16. Apparatus as in claim 15 wherein said means responsive to the pressure of the gas in the passage responds to the base value thereof to produce a base component of said force which is exerted in a direction to urge the surface follower body toward the one surface of the sheet.

17. Apparatus as in claim 15 wherein the gas flow limiting means comprises a first and a second restriction, the relative sizes of the restrictions determining the magnitude of the base force component in relation to the magnitude of the pressure of the gas in the passage.

18. Apparatus as in claim 17 wherein the means responsive to the pressure of the gas in the passage comprises an area on the surface follower body that is located so as to face generally away from the sheet surface against which the pressurized gas is being discharged, said area having applied thereto the gas pressure existing between the first and second restrictions.

19. Apparatus as in claim 18 comprising a piston having one face forming said area on the surface follower body, and a cylinder defining with said area an enclosed space that is pressurized with the gas pressure existing between the first and second restrictions, the piston being movable in the cylinder along the surface follower path.

20. Apparatus as in claim 19 wherein the second restriction comprises the clearance gap between the cylinder and the piston.

21. Apparatus as in claim 20 wherein the second flow of gas passes through the clearance gap and is vented to ambient pressure.

22. Apparatus as in claim 15 wherein the second flow of gas is vented to ambient pressure.

23. Apparatus as in claim 1 comprising means for receiving pressurized gas and for conducting the same to the passage without allowing the pressurized gas to exert a substantial net force tending to change the distance of the body from the surface.

24. Apparatus as in claim 2 wherein the pressurized gas delivery means comprises means for conducting the pressurized gas to the passage without allowing the pressurized gas to exert a substantial net force tending to change the distance of the body from the surface.

25. Apparatus as in either of claims 23 or 24 comprising a cylinder for guiding the body along the surface follower path, and wherein the means for conducting the pressurized gas to the passage comprises a pair of piston-like lands on the surface follower body for receiving the pressurized gas therebetween, the lands being movable in the cylinder and adapted to generate substantially equal and oppositely directed forces on the body generally parallel to the surface follower path.

26. Apparatus as in claim 25 wherein during a gauging operation the lands and the cylinder form a gas bearing for constraining and guiding the surface follower body without substantial solid bodily contact between the lands and the cylinder.

27. Apparatus as in claim 26 wherein the surface follower body is arranged to spin around a central axis within the surface follower path, and wherein the means for conducting the pressurized gas to the passage is arranged to direct the pressurized gas against the surface follower body so as to impart thereto a spinning motion around the axis.

28. Apparatus as in claim 27 comprising means for detecting the spinning motion of the body without solid bodily contact therewith.

29. Caliper gauge apparatus as in either of claims 1 or 2 comprising proximeter target means aboard the surface follower body, and means including proximeter probe means on the opposite side of the sheet from the body and responsive to the distance separating the target means from the probe means for producing a response to the thickness of the sheet.

30. Apparatus as in claim 29 wherein the proximeter probe means is aboard a second surface follower body.

* * * * *